: 3,849,484
Patented Nov. 19, 1974

3,849,484
PROCESS FOR THE PRODUCTION OF
PERCARBOXYLIC ACID
Peter Hoffmann and Gerd Schreyer, Grossauheim, Otto
Weiberg, Neu Isenburg, and Wolfgang Weigert, Offenbach, Germany, assignors to Deutsche Gold- und Silber-Scheideanstalt vormals Roessler, Frankfurt am Main, Germany
No Drawing. Filed May 11, 1972, Ser. No. 252,194
Claims priority, application Germany, May 21, 1971,
P 21 25 160.5
Int. Cl. C07c 73/10
U.S. Cl. 260—502 R          13 Claims

ABSTRACT OF THE DISCLOSURE

Percarboxylic acids are prepared by the reaction of hydrogen peroxide and a carboxylic acid in the gaseous phase in the presence of solid acid catalysts stable under the reaction conditions. The catalyst can be employed on the customary carriers if desired.

---

The present invention is concerned with a process for the production of percarboxylic acids from carboxylic acids and hydrogen peroxide in the presence of acid catalysts in which the reaction takes place in the gaseous phase.

The production of percarboxylic acids from carboxylic acids and/or their derivatives and hydrogen peroxide in the presence of acid catalysts has long been known and is described in the following articles:

Ullmann, Encycl. d. techn. Chemie Erg. Vol. 1970, Neue Verfahren, pages 181 et seq., Urban and Schwarzenberg, Munich;

Kirk-Othmer, Encyclopedia of Chemical Technology, first edition, first Supplement Volume, pages 622 et seq., Interscience, New York, 1957;

Swern, Organic Peroxides, Vol. I, pages 313 et seq., Wiley-Interscience, New York, 1970.

The known processes are afflicted with extraordinary disadvantages. Thus in subsequent reactions with the peracid the disturbing soluble catalyst must be separated. The use of acid ion exchange resins is expensive since they have only a limited life.

Furthermore there is described the production of percarboxylic acids by the oxidation of aldehydes which can be carried out in either the liquid or gas phase (see the literature cited supra). In part there are formed in this method of operation extraordinarily dangerous intermediate products, on the other hand there always results, after conversion to the percarboxylic acid, the corresponding carboxylic as a coproduct, a fact which is extremely undesirable.

The present invention overcomes the named disadvantages and is characterized by the fact that the reaction of the carboxylic acids and hydrogen peroxide is carried out in the vapor phase in the presence of acid catalysts. Surprisingly it has been proven that the hydrogen peroxide (unstabilized) in vapor form is not decomposed on catalysts having large surface area but is transformed in smooth reaction with carboxylic acids and/or esters to percarboxylic acids.

As carboxylic acids there can be used aliphatic, straight chain or branched carboxylic acid which are vaporizable under the conditions of reaction. Preferably there are employed such acids having 2 to 5 carbon atoms or their esters with low molecular weight alcohols. Thus there can be used alkanoic acids such as acetic acid, propionic acid, butyric acid and valeric acid as well as their lower alkyl esters, e.g. methyl acetate, ethyl acetate, propyl acetate, butyl acetate, sec. butyl acetate, amyl acetate, isoamyl acetate, isopropyl acetate, methyl propionate, ethyl propionate, methyl butyrate, ethyl isobutyrate, methyl valerate, ethyl isovalerate, to prepare percarboxylic acids such as peracetic acid, perpropionic acid, perbutyric acid, perisobutyric acid and pervaleric acid.

The hydrogen peroxide is added in aqueous and/or organic solution in which the hydrogen peroxide concentration is fixed on one side by economical considerations and on the other by reason of danger. Preferably there is employed aqueous hydrogen peroxide in a concentration of 35–85%, while the organic solution preferably contains 5–25% of hydrogen peroxide. The organic solvents employed most conveniently are the corresponding carboxylic acids. The proportion of carboxylic acid to hydrogen peroxide is preferably 1.1–10:1, most preferably 1.3–3.0:1.

Unless otherwise indicated, all proportions are by weight.

As catalysts for the reaction of carboxylic acids with hydrogen peroxide in the gaseous phase there are suitable all solid acid materials which are stable under the reaction conditions, for example acidic salts such as ammonium sulfate, alkali metal acid sulfates such as sodium hydrogen sulfate and potassium hydrogen sulfate, barium nitrate, calcium nitrate, magnesium nitrate, aluminum phosphate, aluminum sulfate and preferably boron phosphate.

The catalysts can be employed in pure form or on carriers. As carriers there can be employed the usual catalyst carriers such as aluminum oxide, silica gel and activated carbon for example. The catalysts can also be employed as mixture with each other.

The reaction can be carried out at normal pressure using carrier gases such as nitrogen, argon and helium as well as under reduced pressure. The carrier gas can be 20–75 volume percent of the total vapor volume. In working at reduced pressure there can be employed conveniently 20–200 Torr but this can be varied.

The temperature of the reaction is between 60 and 130° C. The residence time on the catalyst is 0.1–10 seconds, preferably 1–5 seconds, based on the empty reaction tube.

The process can be carried out batchwise or continuously. In a preferred form of the invention a mixture of the carboxylic acid and the hydrogen peroxide is vaporized with a vacuum operating falling stream evaporator with moving inner parts and led over the catalyst bed. The reaction mixture is condensed and removed.

The active oxygen loss is held within reasonable boundaries, the yields based on the hydrogen peroxide added can be 92% and over, according to the reaction and catalyst. The largely water free peracid solution prepared by this process can be freed of water by simple entraining distillation.

The invention is further explained in the following examples.

Example 1

100 grams of a solution containing 13.1% hydrogen peroxide, 24.1% acetic and 62.8% n-butyl acetate were evaporated with a falling film evaporator at 40 Torr and led over a catalyst produced from $Al_2O_3$ and $H_3PO_4$ (aluminum phosphate) at a throughput of 0.56 liter of reaction solution/liter of catalyst per hour (about 1 second residence time). At a reaction space temperature of 70° C. there was formed in a 16.7%, yield based on the hydrogen peroxide added. 4.9 grams of peracetic acid. 7.29 grams of hydrogen peroxide were recovered.

Example 2

100 grams of the solution set forth in Example 1 were evaporated in a falling film evaporator and led over a catalyst produced from $Al_2O_3$ and $H_2SO_4$ (aluminum sulfate) at a throughput of 0.475 l. solution per liter of catalyst per hour (about 1 second residence time). There were obtained 23.5 grams of peracetic acid. This corresponds to a yield of 80.0% based on the hydrogen peroxide added. 1.4 grams of $H_2O_2$ were recovered.

Example 3

100 grams of a solution having the same composition as in Example 1 were vaporized in a falling film evaporator at 40 Torr and led over boron phosphate catalyst produced from boric acid and phosphoric acid with calcining at 600° C. There was a throughput of 0.106 l. solution/l. catalyst per hour (about 5 seconds residence time) at 60° C. There were obtained 23.2 grams of peracetic acid. This corresponds to a yield of 79.3% based on the $H_2O_2$ added. There were recovered 0.8 grams of $H_2O_2$.

The percentages in the above examples and in the following examples are weight percents.

TABLE 1

[Examples of the production of perpropionic acid in the gas phase over boron phosphate]

| Example | Temperature of catalyst, °C. | Pressure, torr | Residence time based on the empty tube, sec. | Yield based on the added $H_2O_2$, percent | $H_2O_2$ conversion, percent |
|---|---|---|---|---|---|
| 4 | 70 | 80 | 0.3 | 64.1 | 64.5 |
| 5 | 70 | 80 | 0.7 | 81.5 | 81.9 |
| 6 | 70 | 80 | 1.5 | 93.8 | 94.4 |
| 7 | 70 | 80 | 3.0 | 96.3 | 98.8 |
| 8 | 70 | 80 | 5.0 | 93.7 | 98.3 |
| 9 | 60 | 80 | 1.5 | 88.5 | 94.4 |
| 10 | 80 | 80 | 1.5 | 93.3 | 97.0 |
| 11 | 90 | 80 | 1.5 | 92.5 | 95.2 |
| 12 | 110 | 80 | 2.0 | 88.2 | 93.4 |
| 13 | 72 | 50 | 1.0 | 77.0 | 87.2 |

The compositions of the starting reaction solutions were as follows:

Examples 4–11: 11.6% $H_2O_2$, 86.3% propionic acid, 2.1% water

Example 12: 25.0% $H_2O_2$, 70.6% propionic acid, 4.4% water

Example 13: 19.2% $H_2O_2$, 76.3% propionic acid, 4.5% perpropionic acid.

TABLE 1a

[Examples for the production of perpropionic acid in gas phase over boron phosphate]

| Example number | Composition of the reaction product | | |
|---|---|---|---|
| | $H_2O_2$ | Perpropionic acid, percent | $H_2O$, percent | Propionic acid, percent |
| 4 | 4.28 | 20.2 | 5.9 | 69.6 |
| 5 | 2.12 | 25.6 | 7.0 | 65.3 |
| 6 | 0.67 | 29.4 | 7.9 | 62.1 |
| 7 | 0.23 | 30.2 | 8.3 | 61.3 |
| 8 | 0.20 | 29.4 | 8.4 | 62.0 |
| 9 | 1.4 | 28.1 | 7.4 | 63.1 |
| 10 | 0.35 | 29.4 | 8.1 | 62.1 |
| 11 | 0.38 | 29.1 | 8.1 | 62.3 |
| 12 | 1.6 | 59.2 | 16.9 | 21.9 |
| 13 | 2.5 | 43.0 | 8.9 | 45.6 |

TABLE 2

[Production of perpropionic acid in the Vapor phase under normal pressure]

| Example number | Temperature, of catalyst, °C. | Pressure, torr | Residence, sec. | Carrier gas ($N_2$), percent of total gas | Yield, based on added $H_2O_2$, percent | $H_2O_2$, reacted, percent |
|---|---|---|---|---|---|---|
| 14 | 108 | 760 | 1.5 | 77 | 75.5 | 91.4 |
| 15 | 105 | 760 | 3.0 | 77 | 75.4 | 96.5 |
| 16 | 137 | 760 | 3.0 | 18 | 63.8 | 94.6 |
| 17 | 130 | 760 | 3.0 | 54 | 75.1 | 93.2 |
| 18 | 130 | 760 | 3.0 | 77 | 71.5 | 83.9 |
| 19 | 132 | 760 | 1.4 | 18 | 61.0 | 86.8 |
| 20 | 128 | 760 | 1.4 | 54 | 68.4 | 85.8 |
| 21 | 125 | 760 | 1.4 | 77 | 72.9 | 88.1 |
| 22 | 138 | 760 | 0.7 | 18 | 44.3 | 67.2 |
| 23 | 130 | 760 | 0.7 | 54 | 49.6 | 58.9 |
| 24 | 130 | 760 | 0.7 | 77 | 49.4 | 57.7 |

TABLE 2a

[Production of perpropionic acid in the vapor phase under normal pressure]

| Example | Composition of the added $H_2O_2$ solution | | | Composition of the reaction product | | | |
|---|---|---|---|---|---|---|---|
| | $H_2O_2$, percent | Perpropionic acid, percent | Propionic acid, percent | $H_2O_2$, percent | Perpropionic acid, percent | Propionic acid, percent | $H_2O$, percent |
| 14 | 15.4 | 4.9 | 75.7 | 1.7 | 44.0 | 44.5 | 9.7 |
| 15 | 19.4 | 4.6 | 76.0 | 0.7 | 44.0 | 45.0 | 10.2 |
| 16 | 17.8 | 7.6 | 74.6 | 1.0 | 36.1 | 53.7 | 9.6 |
| 17 | 17.8 | 6.3 | 75.9 | 1.2 | 39.6 | 50.6 | 8.3 |
| 18 | 18.0 | 6.5 | 75.5 | 3.0 | 39.9 | 48.9 | 8.2 |
| 19 | 18.3 | 5.4 | 76.3 | 2.5 | 33.8 | 55.0 | 8.7 |
| 20 | 17.7 | 7.9 | 74.4 | 2.6 | 38.5 | 50.6 | 8.3 |
| 21 | 18.3 | 5.9 | 75.8 | 2.3 | 40.2 | 48.7 | 8.9 |
| 22 | 19.7 | 5.1 | 75.2 | 6.7 | 25.9 | 60.2 | 7.2 |
| 23 | 18.1 | 5.8 | 76.1 | 7.6 | 27.2 | 59.5 | 5.7 |
| 24 | 19.5 | 5.6 | 74.9 | 8.6 | 29.4 | 55.8 | 6.1 |

TABLE 3

[Production of peracids in the vapor phase over boron phosphate]

| Example | Added carboxylic acid | Temp. of catalyst, °C. | Pressure, torr | Residence time based on empty tube, sec. | Yield, percent | Reaction, percent | Composition of the reaction product | | | |
|---|---|---|---|---|---|---|---|---|---|---|
| | | | | | | | $H_2O_2$, percent | Percarboxylic acid, percent | $H_2O$, percent | Carboxylic acid, percent |
| 25 | Acetic acid | 110 | 80 | 1.3 | 88.4 | 97.3 | 0.38 | 30.8 | 10.7 | 58.1 |
| 26 | do | 110 | 80 | 2.0 | 90.4 | 97.8 | 0.33 | 31.2 | 10.8 | 57.7 |
| 27 | do | 110 | 80 | 3.0 | 92.4 | 98.5 | 0.27 | 31.9 | 10.8 | 57.0 |
| 28 | Isobutyric acid | 82 | 50 | 2.6 | 86.5 | 97.5 | 0.3 | 34.3 | 5.6 | 60.1 |

Note.—Composition of the reacting solution:
Examples 25–27 = 15.5% $H_2O_2$, 81.8% acetic acid, 2.7% $H_2O$.
Example 28 = 10.8% $H_2O_2$, 5.9% perisobutyric acid, 83.3% isobutyric acid.

As used in the present specification and claims "an inert gas" means a gas which is inert in the reaction of hydrogen peroxide with the carboxylic acid or ester thereof.

What is claimed is:

1. In a process for the production of a percarboxylic acid by reacting hydrogen peroxide with a member of the group consisting of alkanoic acids having 2 to 5 carbon atoms and alkyl esters thereof having 1 to 5 carbon atoms in the alkyl group the improvement comprising carrying out the reaction in the gaseous phase at a temperature of 60 to 138° C. at a pressure from 20 Torr to normal pressure in the presence of a solid acid catalyst selected from the group consisting of ammonium sulfate, an alkali metal acid sulfate, barium nitrate, calcium nitrate, magnesium nitrate, aluminum phosphate, aluminum sulfate and boron phosphate.

2. A process according to claim 1 wherein said member is acetic acid, propionic acid, butyric acid or isobutyric acid.

3. A process according to claim 1 wherein the solid acid catalyst is aluminum sulfate or aluminum phosphate.

4. A process according to claim 1 wherein the acid catalyst is boron phosphate.

5. A process according to claim 1 wherein the reaction is carried out at 60–130° C.

6. A process according to claim 5 wherein the catalyst is aluminum sulfate, aluminum phosphate or boron phosphate.

7. A process according to claim 1 which is carried out in a vacuum of 20–200 Torr.

8. A process according to claim 1 which is carried out at atmosphoric pressure in the presence of an inert carrier gas in an amount of 20–75 volume percent of the gas mixture.

9. A process according to claim 1 wherein the proportion of alkanoic acid or 1 to 5 carbon alkyl ester thereof to hydrogen peroxide is between 1.1–10.0:1.

10. A process according to claim 9 wherein the residence time is 0.1–10 seconds.

11. A process according to claim 10 wherein the catalyst is aluminum sulfate, aluminum phosphate or boron phosphate.

12. A process according to claim 11 wherein said member is an alkanoic acid having 2 to 4 carbon atoms.

13. A process according to claim 12 wherein the ratio of alkanoic acid or ester thereof to hydrogen peroxide is 1.3–3.0:1.

References Cited

UNITED STATES PATENTS

| | | | |
|---|---|---|---|
| 3,284,491 | 11/1966 | Karach et al. | 260—502 R |

FOREIGN PATENTS

| | | | |
|---|---|---|---|
| 803,159 | 10/1958 | Great Britain | 260—502 R |
| 975,715 | 11/1964 | Great Britain | 260—502 R |
| 982,490 | 2/1965 | Great Britain | 260—502 R |

BERNARD HELFIN, Primary Examiner

W. B. LONE, Assistant Examiner